(12) United States Patent
Smadi

(10) Patent No.: US 8,891,419 B2
(45) Date of Patent: Nov. 18, 2014

(54) SYSTEM AND METHOD OF COMMUNICATING WITH A NODE IN A COMMUNICATION NETWORK THROUGH AN INTERMEDIARY NODE

(75) Inventor: Mohammed Nawaf Smadi, Ancaster (CA)

(73) Assignee: Blackberry Limited, Waterloo, Ontario (CA)

( * ) Notice: Subject to any disclaimer, the term of this patent is extended or adjusted under 35 U.S.C. 154(b) by 126 days.

(21) Appl. No.: 13/571,487

(22) Filed: Aug. 10, 2012

(65) Prior Publication Data

US 2014/0044007 A1 Feb. 13, 2014

(51) Int. Cl.
*H04B 7/00* (2006.01)
*H04W 76/02* (2009.01)

(52) U.S. Cl.
CPC ..................................... *H04W 76/02* (2013.01)
USPC ......................................................... 370/310

(58) Field of Classification Search
CPC . H04W 76/02; H04W 76/022; H04W 76/028; H04W 76/043
USPC .................. 370/310, 315, 328, 338, 342, 345
See application file for complete search history.

(56) References Cited

U.S. PATENT DOCUMENTS

| | | | | |
|---|---|---|---|---|
| 7,146,433 B2* | 12/2006 | Cromer et al. | ................. | 709/239 |
| 7,702,352 B2* | 4/2010 | Conner et al. | ................. | 455/522 |
| 7,760,767 B2* | 7/2010 | Nilo et al. | ...................... | 370/503 |
| 7,986,628 B2* | 7/2011 | Fujinami | ........................ | 370/235 |
| 8,050,212 B2* | 11/2011 | Chandra et al. | ............... | 370/315 |
| 8,050,360 B2* | 11/2011 | Wentink | ........................ | 375/315 |
| 8,346,863 B2* | 1/2013 | Cheng et al. | .................. | 709/204 |
| 8,503,350 B2* | 8/2013 | Park | .............................. | 370/315 |
| 8,510,808 B2* | 8/2013 | McNeil et al. | .................... | 726/5 |
| 8,666,008 B2* | 3/2014 | Denteneer | ...................... | 375/356 |
| 2003/0156558 A1 | 8/2003 | Cromer et al. | | |
| 2005/0094588 A1 | 5/2005 | Wentink | | |
| 2006/0209882 A1* | 9/2006 | Han et al. | ....................... | 370/465 |
| 2007/0147338 A1 | 6/2007 | Chandra et al. | | |
| 2008/0192666 A1* | 8/2008 | Koskan et al. | ................ | 370/311 |
| 2009/0003298 A1 | 1/2009 | Chu et al. | | |
| 2009/0073913 A9* | 3/2009 | Wentink | ........................ | 370/315 |
| 2010/0103924 A1 | 4/2010 | Rao et al. | | |
| 2011/0294502 A1* | 12/2011 | Oerton | ........................ | 455/426.1 |
| 2012/0039195 A1 | 2/2012 | Jung et al. | | |
| 2012/0087246 A1 | 4/2012 | Kim et al. | | |

FOREIGN PATENT DOCUMENTS

WO WO 2010/053544 A2 5/2010

* cited by examiner

*Primary Examiner* — Dmitry H Levitan
(74) *Attorney, Agent, or Firm* — McCarthy Tétrault LLP

(57) ABSTRACT

The disclosure describes a system, method, device and server for establishing communication links in a network for a device. Communications may be carried from the device through an intermediary communication device to an access point in a wireless communication network. The method comprises: monitoring for a first trigger condition to seek the intermediary communication device, where the trigger condition is related to at least one of the communication device or the network; and upon detection of the first trigger condition identifying the intermediary communication device in the network, establishing a first connection between the communication device and the intermediary communication device and a second connection between the intermediary communication device and the access point to transmit communications from the communication device to the access point and transmitting a message from the communication device for the access device using the first connection and the second connection.

15 Claims, 7 Drawing Sheets

SYSTEM AND METHOD OF COMMUNICATING WITH A NODE IN A COMMUNICATION NETWORK THROUGH AN INTERMEDIARY NODE

FIELD OF DISCLOSURE

The disclosure describes generally a system and method for a communication device to communicate with a node in a communication network (which may be operating as a server for the network) via an intermediary node in the communication network. In particular, for a communication device, the disclosure relates to identifying and configuring an intermediary communication device in a Wireless-Fidelity (Wi-Fi) (trade-mark) network that the communication device may use to communicate with an access point device in the network in certain conditions.

BACKGROUND OF DISCLOSURE

Wireless mobile communication devices perform a variety of functions to enable mobile users to stay organized and in contact with others in a communication network through e-mail, schedulers and address books. Wireless devices are designed to enter and leave different wireless networks.

Wireless networks utilize communication hubs to communicate with the wireless devices. Some hubs provide access points (APs) to their networks as hard wired terminals. Wireless hubs are also available that have dual functions to maintain wireless connections for their associated devices in the network and to provide local functions for their user. The range of wireless communications for the hubs is limited. In certain cases, a communication device cannot communicate directly with the hub and as such cannot get access to the network.

BRIEF DESCRIPTION OF THE DRAWINGS

Embodiments of the invention will now be described, by way of example only, with reference to the accompanying drawings, in which.

DESCRIPTION OF EMBODIMENTS

Figure 1A:
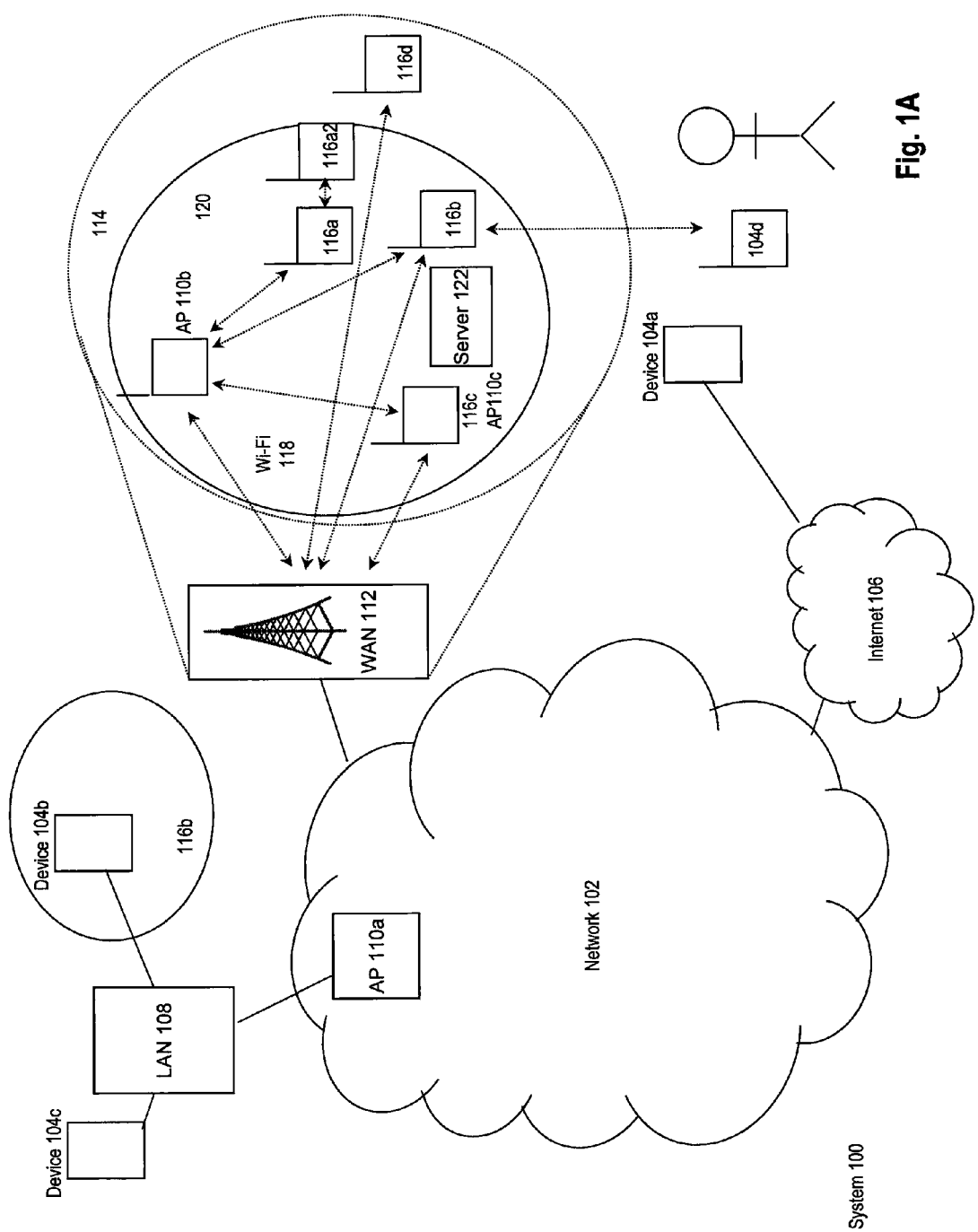
FIG. 1A is a schematic diagram of a communication system including a wireless communication network having a server, an access point communicating with a communication device according to an embodiment.

Exemplary details of embodiments are provided herein. The description that follows and the embodiments described therein are provided by way of illustration of an example or examples of particular embodiments of principles of the present disclosure. These examples are provided for the purposes of explanation and not limitation of those principles and of the disclosure. In the description that follows like parts are marked throughout the specification and the drawings with the same respective reference numerals.

Briefly, an embodiment provides systems, methods, processes and devices for managing making a connection to a "server" in a communication network through an intermediary communication device in the network. An exemplary communication network is a wireless network having a wireless transceiver acting as an access point (AP) for the network that communicates with wireless devices in the transmission area of the network. The transceiver generates through its antenna a transmission area for sending and receiving wireless transmissions. A device that is outside the transmission area or otherwise cannot communicate with the transceiver can establish an intermediary communication link to an intermediary communication device in the network. Subsequently, the intermediary communication device provides a bridge for communications between the device and the transceiver through the intermediary communication device. As such, when the device is outside the transmission area of the transceiver, the device has effectively extended the range of the transmission area for its transmissions by using the intermediary communication device.

In a first aspect, a method of identifying for a communication device an intermediary communication device to carry communications from the communication device destined to an access point in a wireless communication network is provided. The method comprises: monitoring for a first trigger condition to seek the intermediary communication device, where the first trigger condition is related to at least one of the communication device or the network; and upon detection of the first trigger condition identifying the intermediary communication device in the network, establishing a first connection between the communication device and the intermediary communication device and a second connection between the intermediary communication device and the access point to transmit communications from the communication device to the access point and transmitting a message from the communication device for the access device using the first connection and the second connection.

The method may further comprise upon detection of the first trigger condition tearing down a direct connection between the communication device and the access point.

In the method, the network may be an IEEE 802.11 class network; and the first connection may provide a layer 2 bridge between the communication device and the intermediary communication device.

In the method, the first trigger condition may be a threshold related to any one or more of a battery level of the communication device, a Specific Absorption Rate level of the communication device, and a communication bandwidth level between the communication device and the access point.

The method may further comprise: monitoring for a second trigger condition to re-establish the direct connection between the communication device and the access point; and upon detection of the second trigger condition re-establishing the direct connection between the communication device and the access point and tearing down the first connection and the second connection.

In the method, the communication device may share account parameters with the intermediary communication device for communications managed by the network.

In the method, the access point may not send a re-association message the communication device when the direct connection is re-established.

In the method, the trigger condition may be that the communication device has a trusted status with the intermediary communication device.

The method may further comprise providing a trusted service in the network that the intermediary communication device has been certified to access to the communication device through the first and second communication links based on the trusted status.

In the method, communications from the communication device to the access device carried over the first and second communication links may be treated by the access device as communications sent from the intermediary communication device to the access device.

In the method, the intermediary communication device may be identified from a plurality of devices in the network based on a quality of a communication link between the communication device and the intermediary communication device. Can we add that the actual intermediary device be suggested or nominated by other peers in the same network In the method, a server communicating in the network may identify the intermediary communication device from the plurality of devices.

In the method, the quality of the communication link between the communication device and the intermediary communication device may relate to a proximity of the communication device to the intermediary communication device.

In the method, the quality of the communication link between the communication device and the intermediary communication device may relate to a second communication link in a second network between the communication device and the intermediary communication device.

In the method, the second network may be a cellular network.

In a second aspect, a method of identifying for a communication device a plurality of intermediary communication devices to carry communications from the communication device destined to an access point in a wireless communication network is provided. The method comprises: monitoring for a trigger condition to seek the plurality of intermediary communication devices, where the trigger condition is related to at least one of the communication device or the network; upon detection of the trigger condition identifying the plurality intermediary communication devices in the network, establishing a first connection between the communication device and the plurality of intermediary communication devices, a plurality of connections among the plurality of intermediary communication devices and a second connection from one of the plurality of intermediary communication devices and the access point to transmit communications from the communication device to the access point, tearing down a direct connection between the communication device and the access point and transmitting a message from the communication device for the access device using the first connection, the plurality of connections and the second connection.

In a third aspect, a communication device communicating with an access point in a network is provided. The communication device comprises: a communication module to process communications with the network; a processor; a first module providing instructions to the processor to monitor for a trigger condition to seek an intermediary communication device in the network to communicate with the access point, where the trigger condition is related to at least one of the communication device or the network; a second module that upon detection of the trigger condition provides instructions to the processor to identify the intermediary communication device in the network, establish a first connection between the communication device and the intermediary communication device in the network and a second connection between the intermediary communication device and the access point in the network to transmit communications from the communication device to the access point; and a third module that after establishment of the first and second connections provides instructions to the processor to transmit a message from the communication device for the access device using the first connection and the second connection.

In the communication device, the second module may further provide instructions to the processor to tear down a direct connection between the communication device and the access point.

In the communication device the network may be an IEEE 802.11 class network; and the first connection may provide a layer 2 bridge between the communication device and the intermediary communication device.

In the communication device, the trigger condition may be a threshold related to any one or more of a battery level of the communication device, a Specific Absorption Rate level of the communication device, and a communication bandwidth level between the communication device and the access point. What about security modes?

In other aspects, various combinations of sets and subsets of the above aspects are provided.

Now, further details are provided on an embodiment and its network management features. In one configuration for the network, a transceiver and devices in the network have a "server/client" relationship, where the transceiver is a "server" device for the network and the devices are the "clients". In some networks, the server may be a fixed device, such as a wireless router directly connected to a physical wired Ethernet port in a network. The server operates as a node for the network and channels communications from the client devices destined for other devices in the network (or other networks). Other networks may have a non-fixed server, such as a wireless device. As such, a server may refer to a server that may be: in the same network as the client; located somewhere else in another network (such as in the Internet); or another device that is also in the same network. For the purposes of convenience, and not limitation, the term "fixed" is used herein to describe a device that typically is not mobile, typically has a physical connection to its network (e.g. through an Ethernet port) and typically is powered by a power connection to a utility network (through a power cord). The term "non-fixed" is used herein to describe a device that typically is mobile, typically makes a wireless connection to its network and other devices and typically is powered by a self-contained power source (e.g. through a battery). The terms "server/clients" refer generally to devices that are related in some hierarchical manner (e.g. with a designated parent) or non-hierarchical network (e.g. in a peer-to-peer network). Other terms may be used to describe comparable device relationships for an embodiment, such as "master/slave", "network node/client", "access point/clients", "AP/nodes", etc.

Generally, an embodiment provides a system and method for extending a transmission range of a communication network for a device that either: is outside a transmission area of the network, cannot effectively communicate with a server for a network or chooses or is compelled to not communicate directly with the server. An embodiment provides a system and method for the device to identify an intermediary communication device in the network that the device can establish a communication link and uses that intermediary communication device to relay communications from the device through the intermediary communication device to the server (and vice versa). As such, the intermediary communication device is a bridge device providing communications as a relay between the device and the server. The device may initiate processes to identify potential candidates in the network to be the intermediary communication device when certain condition(s) are detected (e.g. insufficient/non-existent communication signals between the device and the server and others, described later). Alternatively a list of possible intermediary devices may be provided to the device.

In a wireless network where a non-fixed server is provided, the server may be a wireless device. As such, a device communicating with the server may have limits on battery resources, wireless transmission/reception capabilities and processing capabilities. At some point, the device may not be able to communicate directly with the server or it may be more economical to communicate with the server through an intermediary communication device. For example, the device may be low on its battery or may be located at a spot which does not provide acceptable direct transmissions (e.g. direct "line of sight" transmissions) to the server. Features of an embodiment may be more relevant for a non-fixed server, but principles can be applied to a fixed server device.

One particular wireless embodiment is implemented for a mobile hotspot Wi-Fi network, where a mobile server (as an access point (AP) to the hotspot) manages communications among nodes in the network. An embodiment can identify an appropriate intermediary communication device in the Wi-Fi network for a requesting device to relay communications from the requesting device to the intermediary node and then from the intermediary node to the AP. The requesting device may or may not be physically in the transmission area of the Wi-Fi network. The device, the intermediary communication device and the AP can be configured to accept and process the relayed communications from the device routed through the intermediary communication device to the AP (and vice versa). With the relayed communications, the transmission area of the network may be extended for the device, since the device is effectively communicating with AP through the intermediary communication device, as the device only has to be able to communicate with the intermediary.

By using identification and selection processes for an embodiment, a wireless network provides a dynamic set of intermediary communication devices for a requesting device. The set of intermediary communication devices can be selected to reduce or minimize processing efforts (and therefore battery power) required by the requesting device to maintain a communication link with the AP. Intermediary communication devices can be selectively added and/or deleted from a list of recognized devices maintained by the server for the requesting device. Certain devices may be identified as intermediary devices depending on conditions of the network, device or possible intermediary device. For example, a potential intermediary device may be deemed to be a viable candidate to be an intermediary device for the device in the network under certain conditions. Such conditions may include an emergency condition (as defined by the device and/or the network) and device requirements (e.g. certain classes of devices are expressly allowed or not allowed to have intermediary devices under certain conditions, which may include a device being configured to be able to pay for to establish a connection to the intermediary device.

For fixed or non-fixed servers, an embodiment provides three separate features that can operate independently of each other or in conjunction with one or more of the other features. An embodiment provides processes for identifying when a requesting device should initiate a request to identify and select an intermediary communication device to carry the requesting device's communications to the AP (and vice versa). Second, an embodiment provides processes for identifying and selecting intermediary communication devices for a requesting device. Third, an embodiment provides processes for routing communications originally destined to be carried directly from the requesting device to the AP to be routed through the intermediary communication device (and vice versa). Each of the three features is discussed below. Other features may be provided relating to how to re-establish or establish a network directly between the requesting device and the AP.

Before discussing more details on specific features of an embodiment, a description is provided on a network having a device, as a server, that provides connections to other devices, as clients, according to an embodiment. Then, details are provided on an exemplary device in which an embodiment operates.

Figure 1B:
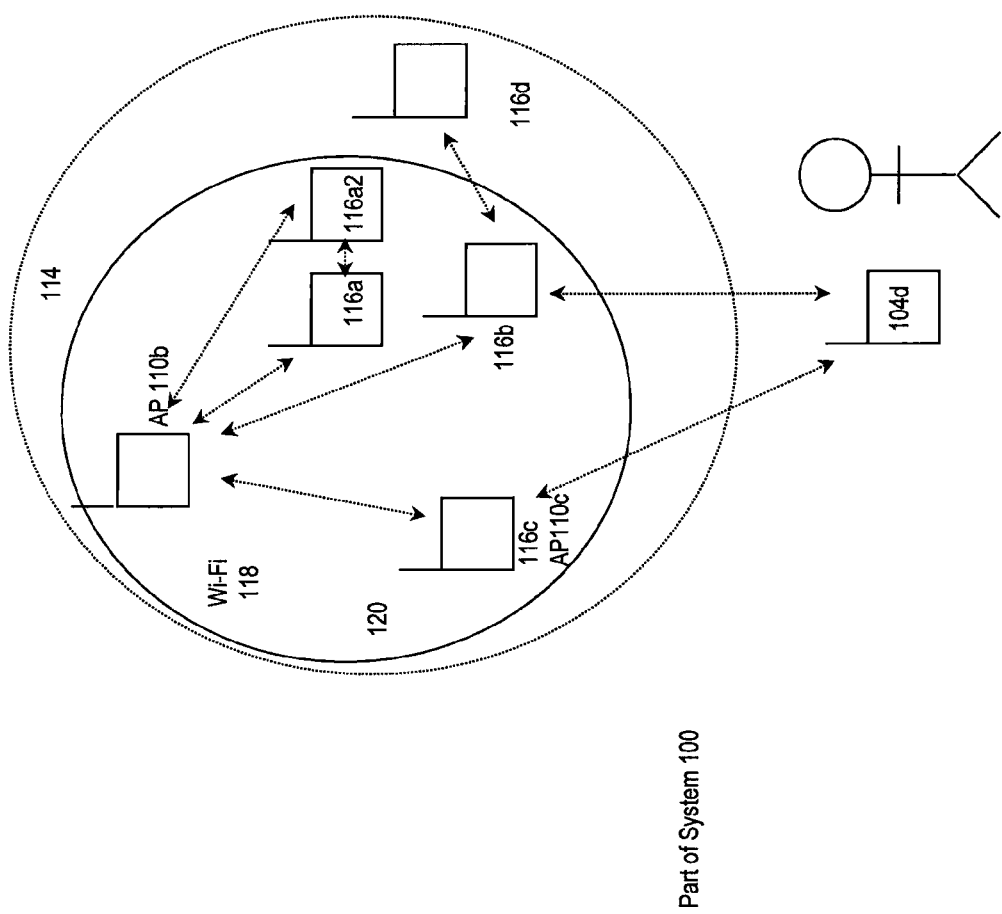
FIG. 1B is a schematic diagram of a portion of the wireless communication network of FIG. 1A where the access point is communicating with the communication device and other devices in its network according to an embodiment.

First, details are provided on exemplary networks where devices according to an embodiment may operate. Referring to FIGS. 1A and 1B, details on a system of exemplary networks and communication devices according to an embodiment are provided. FIG. 1A shows communication system 100 where network 102 provides access to a suite of applications, services and data to its connected devices 104 (and other devices) through its associated servers. Network 102 may be implemented in any known architecture, providing wired and/or wireless connections to its elements. It will be appreciated that in other embodiments, various networks and subnetworks as described herein may be incorporated into other networks.

Internet 106 may be connected to network 102 providing a connection for device 104a to network 102. Local area network (LAN) 108 is connected to network 102 and provides local wired and wireless connections to its devices 104b and 104c. AP 110a provides a connection within network 102 to LAN 108.

To provide some details on exemplary wireless communications, a wireless network provides wireless communication coverage to devices that are located within the wireless transmission area of the Wide Area Network (WAN). In FIG. 1A, one exemplary wireless network is a WAN 112 having a transmission area defined schematically by circle 114. Devices 116 have wireless communication capabilities with one or more wireless networks (described later). WAN 112 may have multiple transmission areas by having multiple communication towers. A WAN network may be provided by a cellular communications company, such as Verizon (trademark).

Wireless devices 116a-d communicate through the data link layer in network 112. In an exemplary environment, network 112 is a local, geographically small, wireless network. Wireless devices 116 include handheld devices, cell phones and computers (either desktop or portable) having a (wireless) network card, network adapter and/or network interface controller ("NIC") installed therein. Bi-directional arrows connecting AP 110b and devices 116a-d to the schematic tower of WAN 112 show individual communication links established for those devices to WAN 112.

Network 118 in one embodiment is a Wi-Fi network that generally follows standards set by the IEEE LAN/MAN Standards Committee, known as IEEE 802, through its working group "11". The IEEE 802.11 standard defines media access control (MAC) and physical (PHY) layers in the OSI protocol model for a wireless local area network (WLAN). A Wi-Fi network is one type of WLAN. Currently, the IEEE 802.11 amendments encompass six wireless modulation techniques that all use the same communication protocol among their communicating elements. Other modulation techniques may be used. Current versions of IEEE 802.11 networks include: 802.11a, b, g and n, representing PHY amendments to IEEE 802.11. Specific transmission details and parameters of these networks and channels are known to those of skill in the art.

In network 118, AP 110b is shown, which supports radio transmission equipment known to those skilled in the art. AP 110b is a communication device that contains an IEEE 802.11 radio receiver/transmitter (or transceiver) and functions as a bridge between network 112 and other networks (such as network 102, Internet 106 and/or LAN 108) for its carried communications. As such, AP 110b establishes a Wi-Fi network which happens to be operating within WAN 112. Wi-Fi network 118 has a transmission area denoted by circle 120 and covers devices 116a-c. Circle 120 does not include coverage to device 116d. Bi-directional arrows connecting AP 110b to devices 116a-c show individual communication links established for those devices to AP 110b. AP 110b provides data distribution services among devices 110 within area 120 under network 118 simultaneously with communications provided by network 112. AP 110b may be a non-fixed wireless device and as such AP 110b is effectively another wireless device 116. "Hotspot" functionalities for AP 110b may be provided in devices 116. For example, device 116c may have capabilities to be another Wi-Fi hotspot host and operate as AP 110c. As AP 110b is the data distribution point for its Wi-Fi network, it will be seen that the transmission area is focussed around AP 110b. In one example, as AP 110b moves (as it is a non-fixed device), its transmission area 118 will move with it. A more likely example is that AP 110b is at a fixed location. Generally, it will be the case that device 116 moves and AP 110b is fixed. It will be seen that an AP is one form of a server device and that devices 116 are one form of client devices for a network. Other devices may be provided in the client/server relationship.

For an IEEE 802.11 network, a "station" is a basic component in the network. A station is any device that implements the functionality of an IEEE 802.11 protocol. It may (or may not) have a connection to a wireless local area network. Typically, the IEEE 802.11 connection and communication functions are implemented in hardware and software and may be provided in a network connection circuit or system in a NIC at the station. A station may be any device, including a laptop computer, device 104, wireless device 116, or an AP 110. Stations may be mobile, portable, or stationary. All stations support the IEEE 802.11 station services of authentication, de-authentication, privacy and data delivery. For the purposes of an embodiment as it relates to IEEE 802.11 standards, devices 116 may be considered to be stations.

A service set (SS) is defined as all devices (or stations) associated with a specific local or enterprise IEEE 802.11 wireless LAN(s). A service set identifier (SSID) is a unique 32-character network name, or identifier, that is created and associated with a particular WLAN 112. A basic service set (BSS) is defined a single access point with all its associated stations. An Extended Service Set (ESS) is a set of one or more interconnected basic service sets and associated local area networks.

An IEEE 802.11 network may be implemented in one of many network modes. An "ad hoc" IEEE 802.11 mode allows devices to operate in an independent basic service set (IBSS) network configuration. With an IBSS, there are no access points. Clients in a network communicate directly with each other in a peer-to-peer manner. One type of ad hoc network follows the Wi-Fi Alliance's Peer-to-Peer (P2P) Technical Specification, as defined by the Wi-Fi Alliance Technical Committee P2P Task Group. In an exemplary P2P group, a set of P2P devices communicate with each other. A P2P device may function as a P2P group owner (namely as an administrator) and/or a P2P client; may conduct negotiations to assume a P2P group owner role or P2P client role; may provide network configuration (such as Wi-Fi Simple Configuration or WSC) and network discovery operations; and may support WLAN and P2P concurrent operations. A P2P group owner may provide "AP-like" roles of BSS functionality and services for associated clients in the network (for example P2P clients or legacy clients); may provide network configuration registrar functionality; may provide communication with associated clients; and may provide access to a simultaneous WLAN connection for its associated clients. A P2P client may implement non-AP STA functionality; and may provide WSC enrollee functionality. A P2P device may be configured to provide communications to other P2P devices in a P2P group and to also concurrently operate with a WLAN. AP 110b may provide communications to other P2P devices in a P2P group in Wi-Fi network 118 and to also concurrently operate with a WAN network 112.

In Wi-Fi network 118, communications between AP 110b and device 116a-c are encoded in frames of data transmissions. Frames have predetermined fields to identify the transmitting device and to provide information on different statuses of the device. Different types of frames are transmitted in different situations. Management frames are used to establish and maintain communications between AP 110b and device 116a-c. Within management frames, authentication frames are used by device 116 to initiate a connection request. Other types of management frames may be used to transmit status and data between entities. Association frames allows AP 110b to allocate resources for and synchronize with a device 116. Other classes of frames may also be used to transmit status and data between entities. Other messaging protocols outside of the Wi-Fi standard protocols may also be used.

Server 122 provides services and support for devices and networks connected to it. Server 122 is shown in network 118, but can communicate with networks 112 and 102. Local servers, providing comparable functions as server 120 may be provided in networks 112 and 102. Server 122 provides services for devices in network 118. Server 122 may provide maintenance functions for communication links among devices in network 118.

FIG. 1B shows aspects of Wi-Fi network 118 and WAN 112 in isolation. While features of an embodiment may be implemented for any network, features relating to an embodiment for a Wi-Fi network are described herein. As such, further detail is provided on network 118 and interactions with devices (such as devices 104, which may be external to network 118, AP 110b and devices 116a-c).

Since wireless AP 110b is portable, it may move. As well, its devices 116 may move relative to it. As such, for network 118 and AP 110b, area 120 and devices 116 therein dynamically change, with the quality of the communication link provided for an area ranging from non-existent, to poor, to adequate, to good and to excellent (with values in-between). Several characteristics of the communication link may determine its quality, such as the strength of the RF signal in the link, any error correction procedures conducted for the link, any redundant transmissions made for communications over the link, and others.

Device 116*d* is shown as being inside network 118 and its transmission area 114, but outside the transmission area 120 for the Wi-Fi network surrounding AP 110*b*. As such, device 116*d* can communicate with devices 116*a-c* and AP 110*b* only through network 112. Device 104*d* is shown as being outside network 112 and its transmission area 114 and outside Wi-Fi network 118 and its transmission area 120. An embodiment provides facilities for devices 104*d* and 116*d* to communicate with Wi-Fi network 118, even though devices 104*d* and 116*d* are both outside transmission area 120 for Wi-Fi network 118. Bi-directional arrows connecting AP 110*b* and devices 116*a-c*, device 116*a* and device 116*a*2 and device 116*b* to device 104*d* show individual communication links established for those devices to network 118.

Figure 2:
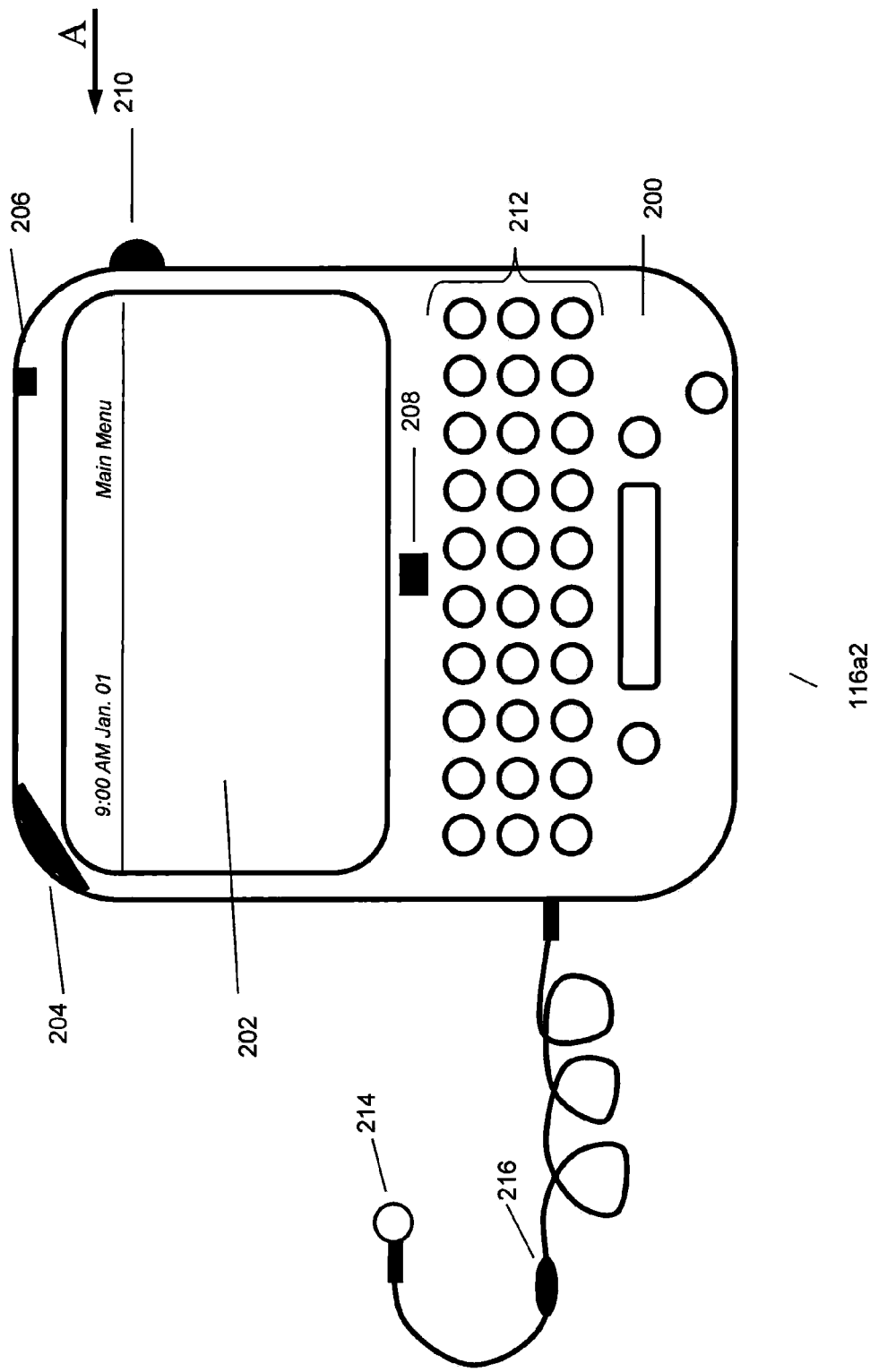
FIG. 2 is a schematic representation of the communication device of FIG. 1B according to an embodiment.

Next, details are provided on an exemplary device according to an embodiment. FIG. 2 provides general features of device 116*a*2 (FIG. 1B) in accordance with an embodiment of the disclosure. These features may also be present in AP 110*b* and devices 104.

In the present embodiment, device 116*a*2 is based on a computing platform having functionality of an enhanced personal digital assistant with cellphone and e-mail features. Device 116*a*2 is a processor-controlled device (not shown). Software applications operating on device 116*a*2 control its operations and network connections to implement the above-noted three features. Further detail on selected applications for an embodiment is provided later. It is understood that device 116*a*2 may be based on construction design and functionality of other electronic devices, such as smart telephones, desktop computers, pagers or laptops having telephony equipment. In a present embodiment, device 116*a*2 includes a housing 200, an LCD 202, speaker 204, an LED indicator 206, an input device 208 (which may be a trackpad, trackball, thumbwheel or other input device), an ESC ("escape") key 210, keypad 212, a telephone headset comprised of an ear bud 214 and a microphone 216. ESC key 210 may be inwardly depressed along the path of arrow "A" as a means to provide additional input to device 116*a*2. It will be understood that housing 200 may be made from any suitable material as will occur to those of skill in the art and may be suitably formed to house and hold all components of device 116*a*2.

Device 116*a*2 is operable to conduct wireless telephone calls, using any wireless phone system. Exemplary technologies are any known wireless phone systems such as a Mobitex (trade-mark) network, a DataTAC (trade-mark) network, a General Packet Radio Service (GPRS) network and also a variety of data and voice communication networks, such as Advanced Mobile Phone Service (AMPS), Time Division Multiple Access (TDMA), Code Division Multiple Access (CDMA) system, wireless CDMA, CDMA 2000 system, Cellular Digital Packet Data (CDPD) system, Personal Communication Service (PCS), Global System for Mobile Communication (GSM), Wi-Fi networks, 3GPP Long Term Evolution (LTE) networks, etc. Other wireless phone systems that device 116*a*2 may support may include Wireless WAN (IMS), Wireless MAN (Wi-Max or IEEE 802.16), Wireless LAN (IEEE 802.11), Wireless PAN (IEEE 802.15, Zigbee and Bluetooth), high-speed data packet access (HSDPA) networks, Evolved High Speed Packet Access (HSPA+) networks, etc. and any others that support voice and data. Additionally, a Bluetooth network may be supported. Other embodiments include Voice over IP (VoIP) type streaming data communications that may simulate circuit-switched phone calls. Device 116*a*2 may have capabilities of communicating with other devices using other communication technologies, including instant messaging (IM) systems, text messaging (TM) systems and short message service (SMS) systems. Ear bud 214 may be used to listen to phone calls and other sound messages and microphone 216 may be used to speak into and input sound messages to device 116*a*2.

Device 116*a*2 may operate as a dual-mode modem. Its mobile data communication functions allow it to make WAN connections and allow it to deliver voice and e-mails to user of device 116*a*2. Overall throughput between AP 110*b* and device 116*a*2 may depend on an instantaneous wireless signal quality of two PHY layers, namely a Physical Coding Sublayer (PCS) and a Physical Medium Dependent (PMD) layer. The PCS encodes and decodes the data that is transmitted and received.

Device 116*a*2 may have modules to provide near field communication (NFC), allowing two devices to communicate wirelessly to each other when they are placed in very close proximity to each other. NFC technologies are an extension of the ISO 14443 proximity-card standard as a contactless card, Radio Frequency Identification (RFID) standard that incorporates the interface of a smart card and a reader into one device. A NFC-enabled device, such as device 116*a*2, typically includes an NFC integrated circuit (IC) that communicates to such devices as existing ISO 14443 smart cards and readers and other NFC devices and compatible with any existing contactless infrastructure. The NFC ICs may magnetic field induction where two loop antennas are located near each other and form an air-core transformer. The NFC technology operates on an unlicensed radio frequency ISM band of about 13.56 MHz and has a bandwidth of about 2 MHz. The working distance for the two devices is usually about between 0 and 20 centimeters. In use, a user of a first NFC device brings it close to another NFC enabled device or tag to initiate NFC communication. NFC data rates range from about 106 to 424 kbit/s.

With some of the components of device 116*a*2 described, further details are provided on how device 116*a*2 (and other devices), communicates with Wi-Fi network 118 using an intermediary communication device, such as device 116*a*, to make a connection to AP 110*b* per an embodiment.

Generally for an embodiment, a device in a network or a device that is attempting to connect to a network may request, may be forced to request and/or may receive a request to seek a connection to an intermediary communication device in the network to ultimately establish a connection to the network. Using the example of network 118, the device may be out-of-communication range with access point 110*b* (such as device 104*d* or device 116*d*, FIG. 1B) or may be compelled to communicate with AP 110*b* through an intermediary communication device, even though the device is technically able to communicate directly with AP 110*b* (such as device 116*a*2, FIG. 1B).

Initiation of a request to make a connection may be set on criteria any combination of a current or expected attribute of any of the requesting device (such as device 116*a*2, 116*d* or 104*d*), AP 110*b*, network 118 and/or an external device (such as a server). An embodiment provides a set of parameters having trigger conditions that determine when to seek an intermediary communication device. One or more of the conditions may be evaluated, weighted and scored against a threshold to determine whether and when to make the request and to what device. Table A provides a non-exhaustive list of exemplary criteria that the requesting device may monitor to determine when such request should be made.

TABLE A

| Parameter | Condition | Notes |
|---|---|---|
| Device related parameters | | |
| Battery Level | Below Threshold | If the battery level of the device is below a prescribed threshold when the device communicates directly with the current AP, then an intermediary communication device may be sought |
| Received Comm. Signal Strength | Below Threshold | If the received communication signal from the AP is below a prescribed threshold, then an intermediary may be sought. The signal strength may be expressed as a signal to noise ratio. |
| Received Comm. Signal Strength | Above Threshold | If the received communication signal from a potential intermediary communication device is above a prescribed threshold, then an intermediary may be sought. |
| Communication Bandwidth | Below Set Threshold | If the available communication bandwidth with the AP is below a prescribed threshold, then an intermediary may be sought |
| Communication Bandwidth | Above Threshold | If the available communication bandwidth from a potential intermediary communication device is above a prescribed threshold, then an intermediary may be used/sought |
| Functional/resource requirement | Function/resource currently absent | If a specific function/resource is needed that is not provided currently by the present AP (e.g. direct connection to another device such as a printer or server or access to a resource or application currently not provided by the AP, then an intermediary may be sought that can provide that function/resource |
| Cost Analysis | Above Threshold | If the "cost" of the device to maintain a connection to the network through the AP exceeds a limit, where the limit may be based on a number of factors, e.g. cost of data transmissions, current battery usage rate, current overhead cost to maintain connection through the AP, etc.), then an intermediary may be sought. This cost may be assessed against a cost of a communication link where an intermediary communication device is provided. |
| Cost Analysis | Below Threshold | If the "cost" of the device to maintain a connection to the network through an intermediary communication device is below a limit, where the limit may be based on a number of factors as noted above, then intermediary may be used/sought |
| Security Analysis | Below Threshold | If the level of security that is provided in the communication link to the network through the AP does not meet minimum requirements, then an intermediary may be sought. The level of security may include that a specific type of encryption (or bit level of encryption) be provided. |
| Operating Temperature | Above Threshold | If the operating temperature of the device exceeds a prescribed limit (e.g. a Specific Absorption Rate - SAR - Limit) when the device communicates directly with the current AP, then an intermediary may be sought |
| Timeout Condition | Data Limit exceeded/Timer expired | If a limit for communicating directly with the current AP is exceeded (e.g. time connected to AP, data transferred with AP, etc.) then an intermediary may be sought |
| Geographic requirement | Current location of device | If the current geographic location of the device has a condition that communications must not be directly provided from the device to the AP, then an intermediary may be sought that can provide that function/resource |

It will be appreciated that a given condition (e.g. cost analysis) may have different thresholds for different parameters. A threshold may be changed during operation of the network. The threshold may be set internally by device 104 or by an external source (e.g. AP 110 or an external server). A threshold may consider a plurality of conditions and may provide different weights to each condition. Again, the weights may be dynamically changed.

As noted, AP 110b (or another device in network 118, including server 122) may initiate a request for device 110a2 to seek an intermediary communication device to communicate with AP 110b. When a change condition is determined by AP 110b (or other devices), it can send a message to device 110a2 to initiate a connection change to seek an intermediary communication device to re-establish/re-configure the connection between device 110a2 and AP 110b through an intermediary. Table B provides a non-exhaustive list of exemplary criteria that devices communicating with device 110a2 (e.g. AP 110b or devices in network 118) may monitor to determine when such request should be sent to device 110a2.

TABLE B

| Parameter | Condition | Notes |
|---|---|---|
| AP/Network related parameters | | |
| Battery Level | Below Threshold | If the battery level of the AP is below a threshold when the device communicates directly with the AP, then the device may be sent a request to seek an intermediary communication device |
| Received Comm. Signal Strength | Below Threshold | If the communication signals between the device and the AP are below a prescribed threshold, then the device may be sent a request to seek an intermediary communication device |
| Communication Bandwidth | Below Threshold | If the available communication bandwidth with the AP is below a prescribed threshold, then the device may be sent a request to seek an intermediary communication device |
| Security Analysis | Below Threshold | If the level of security provided in the communication link to the network through the AP does not meet minimum requirements, then the device may be sent a request to seek an intermediary communication device. Some security parameters have been noted above. |

Now, further details are provided on an exemplary situation where a device may seek a connection to an AP through an intermediary communication device per an embodiment. Referring to FIG. 1B, devices 116a and 116a2 are shown in network 118 and are both in communication directly with AP 110b. Devices 116a and 116a2 may be devices that are closely associated with each other. For example, device 116a may be a mobile device operated by a user and associated with a user account and device 116a2 may be a tablet computing device which is operated by the same user through the same account. Generally, device 116a2 is in close proximity to device 116a. Device 116a2 may be directly connected to device 116a to share certain data and functionalities, so that files may be shared and activities initiated on either device appear to have been initiated from a single device. The connection may be a separate communication link outside network 118. For example, device 116a2 may be "tethered" to device 116a. As such, for example, emails generated on device 116a2 may be finalized and sent from device 116a2, but such emails would appear as if they were sent from device 116a. Device 116a2 and 116a may utilize an agreed upon addressing procedure in processing communications from either device 116a or device 116a2 to network 118. Device 116a2 may be deemed to have a certain level of trust and/or security for communications provided from it in view of its association with device 116a. This level of trust may be need for device 116a2 to access services in network 118 that have been made available to device 116a, in view of a certification of device 116a to network 118. For example, server 122 in network 118 may be providing certain services to its "trusted" devices. Once device 116a becomes certified as "trusted" to server 122, then device 116a2 would also be certified to server 122.

In the above noted configuration, while device 116a2 can communicate directly with AP 110b, using processes provided by an embodiment, device 116a2 communicates with AP 110b through device 116a. As such, for WLAN network 118, device 116a operates as a Layer 2 bridge for device 116a2. As such, device 116a provides local buffering of communications from AP 110b destined for device 116a2 and vice versa. The use of device 116a as an intermediary for device 116a2 may be set once and maintained permanently or it may be re-evaluated on a time or condition basis. Exemplary conditions to determining when a change may be implemented have been noted for both device 116a2 and AP 110b in Tables A and B above. Also in a WLAN network, trigger conditions can be monitored periodically and depending on the values of the conditions at the time of a given monitoring, a change can be initiated. The frequency of the monitoring can be set to maintain channel coherency. In a WLAN network the conditions can be re-evaluated every 100 ms. The frequency of re-evaluation may be lengthened if the condition(s) are found to be not changing or shortened if the condition(s) are found to be changing.

It is noted that when device 116a2 and 116a are utilizing an agreed upon addressing procedure, the devices are in a trusted spoofing configuration, where communications from either device appear to outside devices as being sent from the same device (either device 116a or 116a2). As such, when connections for device 116a2 are re-evaluated, real time insertion/removal of device 116a as the intermediary communication device for device 116a2 is efficient as device 116a2 will not need to be newly associated or re-associated with AP 110b in view of this trusted spoofing. In some circumstances, when device 116a2 is connected through device 116a to AP 110b, connections between AP 110b and device 116a2 may or may not need to be torn down.

Further details are provided on one embodiment and one exemplary process used to identify and establish a communication link with an intermediary communication device in the network, in one the requesting device and the selected intermediary communication device progress through a series of phases, including: an initial contact phase where the requesting device broadcasts messages to see what other devices are in communication range that may be available to act as an intermediary for the device for the network; a communication link formation phase where a communication link is defined between the out-of-range device and the intermediary communication device and between the intermediary communication device and the AP of the network; a communication link maintenance phase where the established communication link from the out-of-range device, to the intermediary communication device, to the AP is used and maintained; and a communication link disband phase, when the communication link is torn down. Operation in a phase and transitioning between phases in controlled in whole or in part by modules operating on the devices (described in more detail later). At a given instance after an intermediary is identified, another device may be identified as a subsequent intermediary to replace and/or overtake the communication link management duties of the current intermediary.

Figure 3:
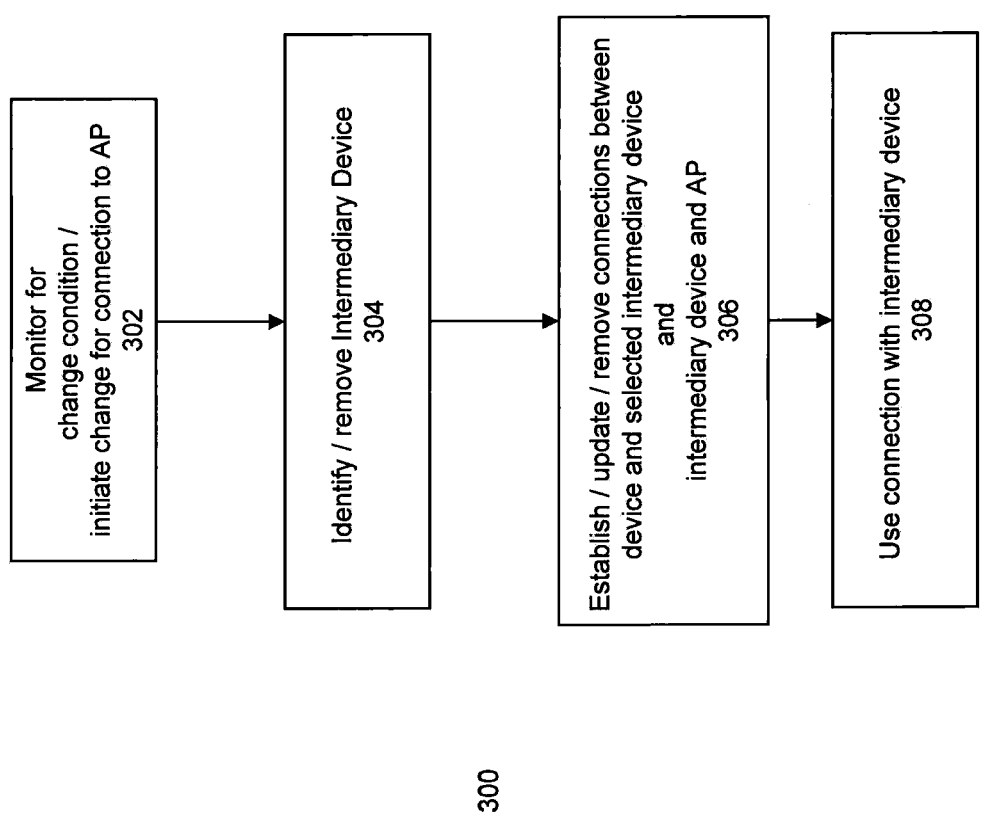
FIG. 3 is a flowchart of exemplary processes executed by the communication device in FIG. 1B in identifying an intermediary communication device to be inserted into a communication link between the communication device and the access point according to an embodiment.

Referring to FIG. 3, process 300 shows a flow chart of processes executed by device 116a2 in executing processes noted above. Process 300 starts with process 302 where device 116a2 and/or AP 110b monitor for a trigger condition relating to one or more parameters of the device and or network. As noted above, the trigger condition may be activated by a combination of any number of parameters. The parameters may be related to device 116a2, by AP 110b or other devices. Signalling protocols may be established among devices in network 118 and the devices may send various signals (as frames) to each other to indicate triggering conditions and other status that may be used to indicate that an intermediary communication device is desired. If the trigger condition was initiated by AP 110b, then AP 110b may need to send appropriate notification frames to device 116a2.

In process 304, once it is determined that an intermediary communication device is to be sought, the intermediary communication device needs to be identified. For the situation where device 116a is tethered or otherwise associated with device 116a2, device 116a may be deemed to be the default intermediary communication device. In other embodiments, device 116a2 may send a request message to other devices in network 118 to identify an appropriate intermediary communication device. Devices in network 118 may receive the request and respond appropriately to device 116a2. Alternatively, AP 110b may maintain or have a list of potential intermediary communication devices for at least some of the devices in network 118 and AP 110b may provide such list to device 116a2. As such, in view of these alternatives, an intermediary communication device may be selected for device 116a2 by device 116a2 or options may be presented to it. In any event, once an evaluation is completed an intermediary communication device for device 116a2 is identified.

In process 306, the intermediary communication device is inserted between existing communication link between device 116a2 and AP 110b. In the present example, device 116a is identified as the intermediary communication device. As such, (at least) the following connections must be established, to the extent they do not exist: a connection between device 116a2 and device 116a; and a connection between device 116a and AP 110b. These connections preferably are negotiated/established with the result that a seamless connection between AP 110b and device 116a2 is established. Once the intermediary communication device is inserted into the communication stream, the original connection between device 116a2 and AP 110b (if it had been established) may be torn down.

In process 308, as the connection between device 116a2 and AP 110b through device 116a has been established, the connection can then be used. It will be appreciated that in other embodiments a chain of two or more intermediary communication devices in the network can also be provided to establish a communication link from device 116*a* and AP 110*b*. In established the chain, an embodiment can incrementally identify additional devices in the chain to complete the link. For example, instead of having a connection be established from device 116*a*2 to device 116*a* to AP 110*b*, a connection may be sought to route from device 116*a*2 to device 116*a* to device 116*b* then to AP 110*b*. The identification can be provided through negotiations and investigations of capacities of potential additional devices as a next portion of the link is established.

It will be appreciated that processes 304, 306 and 308 may be executed in different orders and at different times than provided in process 300.

It will be further appreciated that in certain circumstances, it will be determined that the intermediary communication device should be removed from the communications between device 116*a*2 and AP 110*b*. In such a circumstance, a comparable process to remove the intermediary communication device is provided, which shares features with process 304. In the removal process, process 304 would identify the intermediary communication device to be removed and in process 306, a direct connection between AP 110*b* and device 116*a*2 is established and the intermediary connections involving device 116*a* are torn down.

With aspects of main features of an embodiment described, further detail is now provided on internal components in device 116*a*2, which may also be found in device 104*d* and AP 110*b*.

Figure 4:
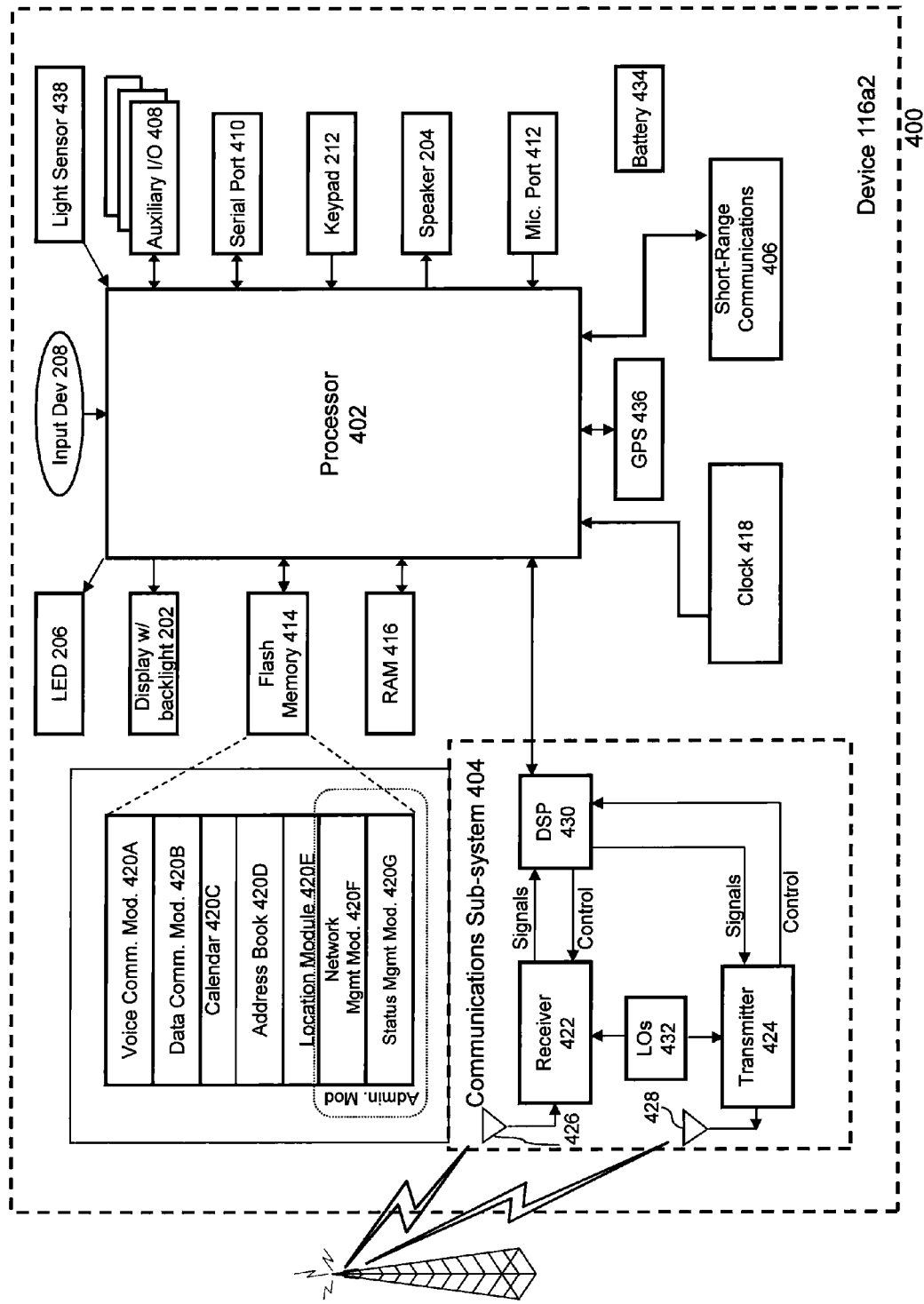
FIG. 4 is a block diagram of internal components of the communication device of FIG. 1B.

With features of various embodiments described, referring to FIG. 4, functional components of device 116*a*2 are provided in schematic 400. The functional components are generally electronic, structural or electro-mechanical devices. In particular, processor 402 is provided to control and receive almost all data, transmissions, inputs and outputs related to device 116*a*2. Processor 402 is shown schematically as coupled to keypad 212 and other internal devices. Processor 402 preferably controls the overall operation of device 116*a*2 and its components. Exemplary processors for processor 402 include processors in the Data 950 (trade-mark) series, the 6200 series and the PXA900 series, all available at one time from Intel Corporation. Processor 402 is connected to other elements in device 116*a*2 through a series of electrical connections to its various input and output pins. Processor 402 has an IRQ input line which allows it to receive signals from various devices and modules. Appropriate interrupt firmware is provided which receives and reacts to the signals detected on the IRQ line. An interrupt signal may be generated by an application to indicate a request to initiate seeking a connection to an intermediate device per an embodiment.

In addition to processor 402, other internal devices of device 116*a*2 are shown schematically in FIG. 4. These include: display 202; speaker 204; keypad 212; communication sub-system 404; short-range communication sub-system 406; auxiliary I/O devices 408; serial port 410; microphone port 412 for microphone 216; flash memory 414 (which provides persistent storage of data); random access memory (RAM) 416; clock 418 and other device sub-systems (not shown). Device 116*a*2 is preferably a two-way radio frequency (RF) communication device having voice and data communication capabilities. In addition, device 116*a*2 preferably has the capability to communicate with other computer systems via the Internet.

Operating system software executed by processor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by the mobile device may also be stored to RAM 416.

In addition to an operating system operating on device 116*a*2, additional software modules 420 enable execution of software applications on device 116*a*2. A set of software (or firmware) applications, generally identified as applications 420, that control basic device operations, such as voice communication module 420A and data communication module 420B, may be installed on device 116*a*2 during manufacture or downloaded thereafter. As well, other software modules are provided, such as calendar module 420C, address book 420D and location module 420E.

Messages received and/or generated by any module 420 may be processed by data communications module 420B. Messages may be transmitted/received in network layer communications, emails, and/or other messaging systems to network 118, AP 110*b* and/or devices 116. Module 420B receives messages from external devices, extracts relevant information from them and provides the information to relevant modules. Module 420B notifications from modules 420, extracts relevant information from them and generates and sends messages containing relevant information to the messages to network 118, including to devices 110. Messages relating to network 112 for device 116*a*2, when operating as an AP may be processed separately by the modules from other non-network 118 communications (e.g. cellular communications).

Network management module (NMM) 420F is software and/or firmware that processes network functions for network 118 for device 116*a*2. This includes monitoring the status of device 116*a*2 and managing incoming and outgoing network management communications. NMM 420F may implement at least parts of process 300 (FIG. 3). Communications and data are streamed through either communication module 404 or 406. NMM 420F may also receive signals from other modules providing information to it on other modules that are using communication module 404 or 406. Any access parameter that is set by an embodiment is evaluated by NMM 420F. Data relating to the access parameters provided by data from device 116*a*2, network 118 and/or devices 104. Processes to evaluate and authenticate connection requests from other devices may be provided in NMM 420F. Communications also can be processed with server 122.

Status Management Module (SMM) 420G is software and/or firmware that monitors network conditions and local operating conditions of device 116*a*2, for example, statuses evaluated in Table A above. Depending on the values of those conditions, data provided by SMM 420G may cause device 116*a*2 to seek an intermediary communication device or to request the removal of an intermediary communication device in its communication link to AP 110*b*. SMM 420G may implement part of the processes relating to triggering network and device changes as provided in processes 300 (FIG. 3).

NMM 420F and SMM 420G individually and collectively provide administrative functions for device 116*a*2 in managing its connections to its network and managing its network administrative functions, when device 116*a*2 is the administrator/group owner for the network. NMM 420F and SMM 420G may be each considered to be (in whole or in part) an administrative module providing instructions to processor 402.

Additional modules such as personal information manager (PIM) application may be provided. Any module may be installed during manufacture or downloaded thereafter into device 116a2.

Data associated with each application, the status of one or more networks, profiles for networks and trigger conditions for commands for networks may be stored and updated in flash memory 414.

Communication functions, including data and voice communications, are performed through the communication subsystem 404 and the short-range communication sub-system 406. Collectively, sub-systems 404 and 406 provide the signal-level interface for all communication technologies processed by device 116a2. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which device 116a2 is intended to operate. For example, communication sub-system 404 of device 116a2 may on network technologies described earlier (e.g. NFC, GPRS, IEEE 802.11 networks, IEEE 802.11 P2P networks, Bluetooth networks, Zigbee, AMPS, TDMA, CDMA, COMA 2000, PCS, GSM, WWAN, WMAN, WLAN, WPAN, IM, TM, SMS, etc.).

Short-range communication sub-system 406 enables communication between device 116a2 and other proximate systems or devices, which need not necessarily be similar devices. For example, the short-range communication sub-system may include an infrared device and associated circuits and components, a Wi-Fi or a Bluetooth (trade-mark) communication module to provide for communication with similarly enabled systems and devices. Sub-system 406 may have one or more inputs or outputs to sub-system 404 in processing signals for its networks.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430. One particular operational aspect of receiver 422 and antenna 426 is that they need to be tuned to receive signals in the IEEE 802.11 network bands, e.g. signals in the 2.4 GHz to 5.8 GHz range for sub-systems 406 and if needed, sub-system 404. Additional filters on antenna may also be used to provide such functionality.

Receiver 422 and antenna 426 provide at least some of the hardware and software elements needed to detect when device 116a2 is in the presence of communication signals from networks 118 and 112.

Powering the entire electronics of the mobile handheld communication device is power source 434. In one embodiment, the power source 434 includes one or more batteries. In another embodiment, the power source 434 is a single battery pack, especially a rechargeable battery pack. A power switch (not shown) provides an "on/off" switch for device 116a2. A power source interface (not shown) may be provided in hardware, firmware, software or a combination of such elements to selectively control access of components in device 116a2 to power source 434. Upon activation of the power switch an application 420 is initiated to turn on device 116. Upon deactivation of the power switch, an application 420 is initiated to turn off device 116. Power to device 116a2 may also be controlled by other devices and by software applications 420.

Device 116a2 may also have global positioning system (GPS) 436 to assist in identifying a present location of device 116a2 and may also have light sensor 438 to provide data on the ambient light conditions for device 116a2.

With some features of device 116a2 described, features of another embodiment provided by server 122 (FIG. 1A) are now provided.

In one embodiment, instead or in addition to decisions on connections and changes being made on a peer-to-peer level as noted above, some or all of these functions can be managed and monitored through a central location in network 118. Server 122 in one embodiment provides these functions.

Figure 5:
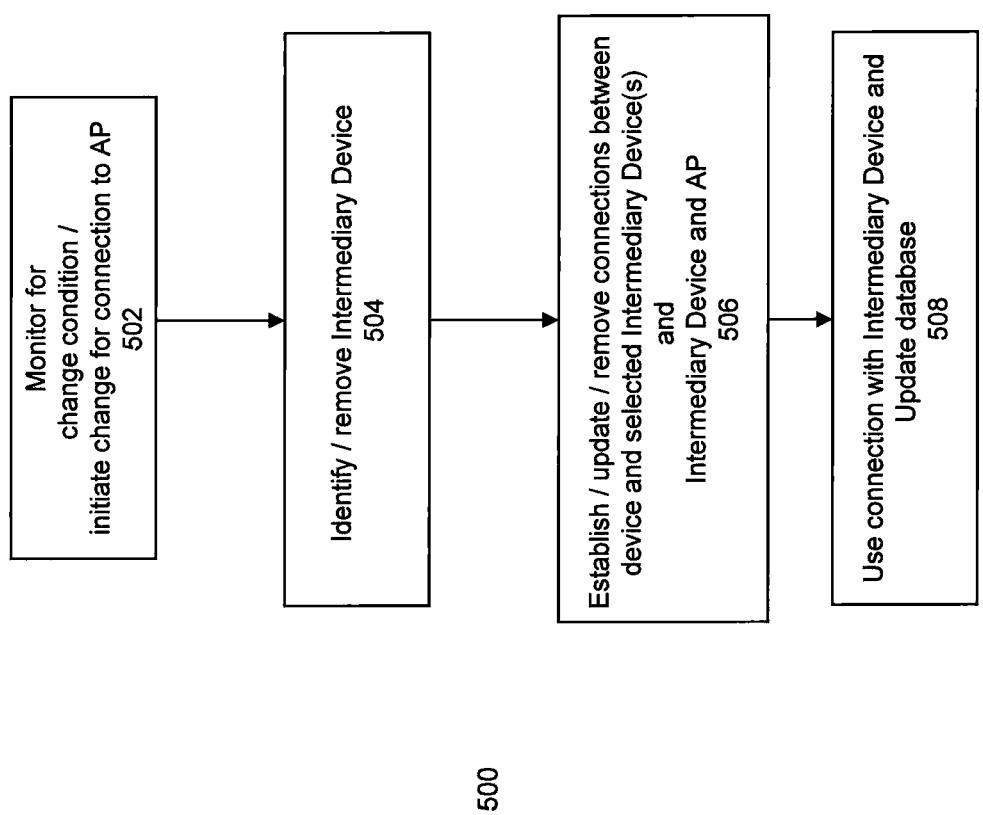
FIG. 5 is a flowchart of exemplary processes executed by the server in FIG. 1A in identifying an intermediary communication device to be inserted into a communication link between the communication device and the access point according to an embodiment.

Referring to FIG. 5, process 500 shows a flow chart of processes executed by server 122 executing device/connection management services noted above. In several aspects, features of server 122 provide centralized features of process 3 (FIG. 3). Process 500 starts with process 502 where server 122 monitors for a trigger condition relating to one or more parameters of the device and or network. As noted above, the trigger condition may be activated by a combination of any number of parameters. The parameters may be related to device 116a2, by AP 110b or other devices. Server 122 may send various signals to the devices other to indicate triggering conditions and other status that may be used to indicate that an intermediary communication device is desired.

In process 504, once it is determined that an intermediary communication device is to be sought, the intermediary communication device needs to be identified. Server 122 may send a request message to other devices in network 118 to identify an appropriate intermediary communication device. Potential intermediary devices can be "nominated" by peers in the network and such nominated devices can be identified to server 122 from messages sent from the devices to server 122. The intermediary communication device may be identified based on a quality of a communication link between the communication device and the intermediary communication device. The quality of the communication link between the communication device and the intermediary communication device may relate to a proximity of the communication device to the intermediary communication device. Additionally or alternatively, the quality may be based on an additional received communication signal strength indicator from other devices. For example, if a device is choosing between two potential intermediary devices and the first potential intermediary device is closer than the second, but there is some interference issue with the first (e.g. a concrete wall between the device and the first potential intermediary device), it may be better to select the second potential intermediary device.

The quality of the communication link between the communication device and the intermediary communication device may relate to a second communication link in a second network between the communication device and the intermediary communication device. The second network may be a cellular network. Devices in network 118 may receive the request and respond appropriately to server 122. Alternatively, server 122 may maintain or have a list of potential intermediary communication devices for at least some of the devices in network 118 and server 122 may provide such list to device 116a2 or select an appropriate intermediary candidate for device 116a2. Server 122 may provide nomination services for identifying and making a device an intermediary communication device for device 116a2.

In process 506, the intermediary communication device is inserted between existing communication link between device 116a2 and AP 110b. In the present example, device 116a is identified as the intermediary communication device. As such, (at least) the following connections must be established, to the extent they do not exist: a connection between device 116a2 and device 116a; and a connection between device 116a and AP 110b. These connections preferably are negotiated/established with the result that a seamless connection between AP 110b and device 116a2 is established. Once the intermediary communication device is inserted into the communication stream, the original connection between device 116a2 and AP 110b (if it had been established) may be torn down. Server 122 may or may not be involved in establishing the intermediary links among devices once the intermediary communication device(s) have been identified.

In process 508, as the connection between device 116a2 and AP 110b through device 116a has been established, the connection can then be used. Server 122 updates databases and status to reflect the intermediary connection.

It will be appreciated that processes 504, 506 and 508 may be executed in different orders and at different times than provided in process 500.

It will be appreciated that all or part of any of trigger condition monitoring, intermediary communication device identification and/or communication link management services provided by server 122 may be provided in device 116a2 or AP 110b. Similarly, any features provided by device 116a2 or AP 110b as noted above may be provided in server 122 as a central location for handling same for network 118.

Figure 6:
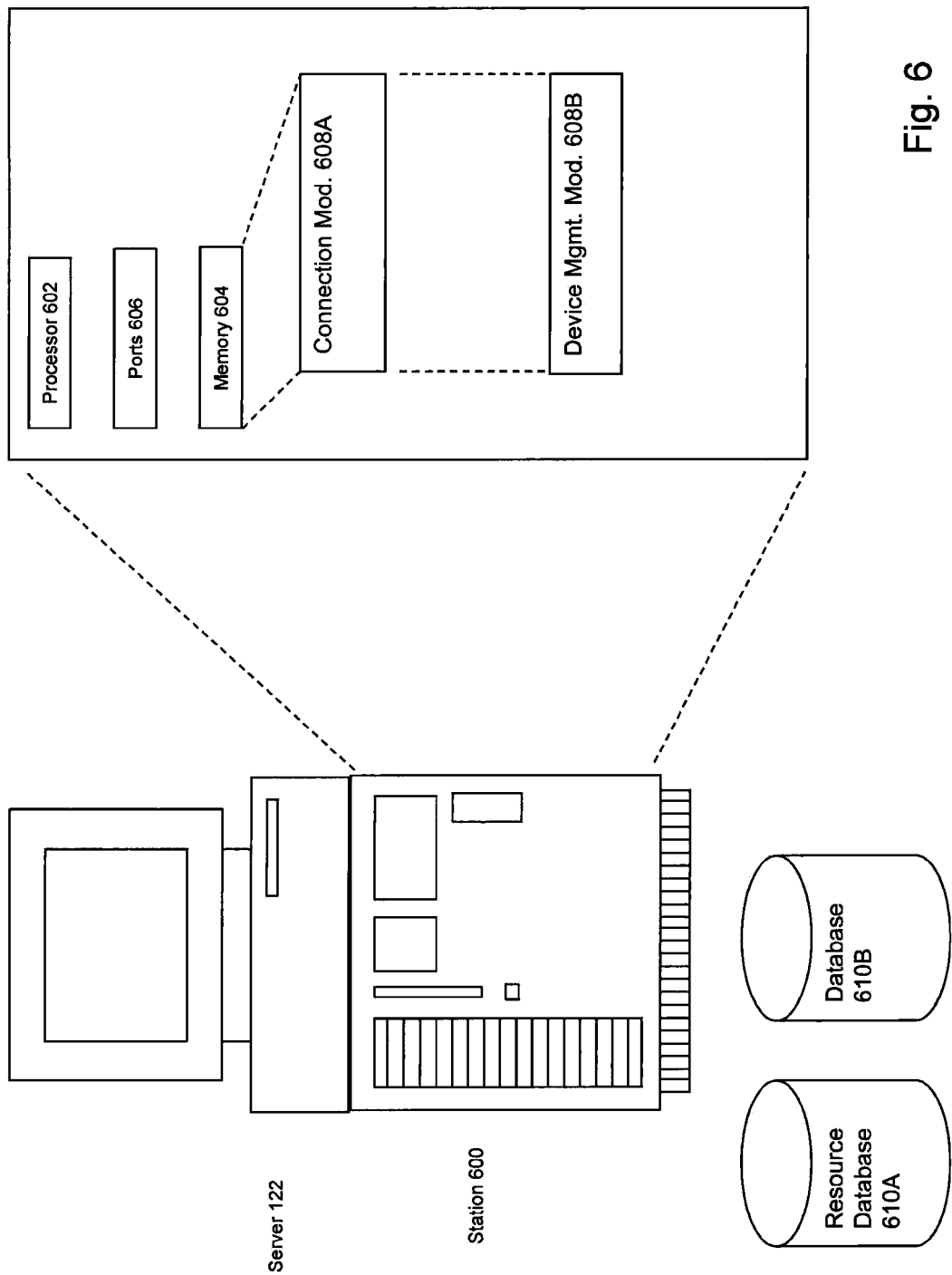
FIG. 6 is a block diagram of internal components of the server of FIG. 1A.

Next, FIG. 6 illustrates details of server 122. In an embodiment, server 122 is based on a general purpose computing platform. It may have the form factor of a desktop or laptop computer. It may be a minicomputer. It may be a virtual server comprising modules that are installed on one or more devices. For network 118, server 122 provides configuration data for devices 116 and it may provide configuration data for AP 110b.

In a present embodiment, server 122 includes processing station 600. Internally, server 122 has processor 602 and memory 604. Connection ports 606 provide one communication connection system to allow server 122 to connect to with network 118 and others. Modules 608 are software applications that execute on processor 602 and may be stored in memory 604. Connection module 608A provides connection-level communication between server 122 and devices in network 118, such as devices 116 and AP 110b to which may include processing of emails, IMs, data and other data transmissions by device 116 to network 118. Databases 610A and 610B (which may be the same or different storage devices) stores data relating to network configurations, policy data, application data, transaction histories and other data.

Device Management Module (DMM) 608B provides an interface and systems for an administrator to manage connections and devices in network 118. The term "device management" generally relates to configuring, provisioning, monitoring the status, detecting errors, managing communication links, updating applications and configuration data for a device through server 122 for network 118. Other functions and monitors for the state of condition of one or more devices and/or application can be provided. Server 122 can manage "trusted" communications that come from a device or its trusted proxy (for example device 116a or device 116a2). Server 122 can track status conditions of devices in network 118 and determine when and if a connection that a device has to AP 110b should be torn down and re-established through one or more intermediary communication devices. Similarly, server 122 can use the status conditions to determine when and if a connection that a device should tear down its intermediary connections and communicate directly to AP 110b.

Device management provides services maintenance and provisioning for devices and applications, including: (i) bootstrap provisioning, remote maintenance and reporting of configuration data to a device; (ii) device diagnostics and fault management; and (iii) application and non-application software/firmware installation, updates/upgrades and management. Server 122 can also define boundaries, whitelists and blacklists for groups of devices in its network 118. As such, server 122 facilitates setting of policies for devices, establishment and maintenance of groups of users and establishment and maintenance of associations of users to devices (as pairings) in network 118.

Although an embodiment has been described in terms of identifying/maintaining server/client device hierarchies in a wireless network, such as an IEEE 802.11 network, the features of an embodiment may be provided in coordinate aspects of different connections among different devices in different networks.

It will be appreciated that NMM 420F, SMM 420G and other modules in the embodiments may be implemented using known programming techniques, languages, processes and algorithms. Although the modules, processes and applications described are implemented in device 116a2, it will be appreciated that some functions of the modules may be provided in a separate server that is in communication with device 116a2. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 116a2 may be executing concurrently with other modules. As such, any of modules 420 (or parts thereof) may be structured to operate in as a "background" application on device 116a2, using programming techniques known in the art.

It will be appreciated that the embodiments relating to client devices, server devices and systems may be implemented in a combination of electronic modules, hardware, firmware and software. The firmware and software may be implemented as a series of processes, applications and/or modules that provide the functionalities described herein. The modules, applications, algorithms and processes described herein may be executed in different order(s). Interrupt routines may be used. Data, applications, processes, programs, software and instructions may be stored in volatile and non-volatile devices described and may be provided on other tangible medium, like USB drives, computer discs, CDs, DVDs or other substrates herein and may be updated by the modules, applications, hardware, firmware and/or software. The data, applications, processes, programs, software and instructions may be sent from one device to another via a data transmission.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method of identifying for a communication device an intermediary communication device to carry communications from the communication device destined to an access point in a 802.11 network, the method comprising:
    monitoring for a first trigger condition to seek the intermediary communication device, where the first trigger condition is related to at least one of the communication device or the 802.11 network; and
    upon detection of the first trigger condition
        identifying the intermediary communication device in the 802.11 network;
        establishing a first connection between the communication device and the intermediary communication device in the 802.11 network and a second connection between the intermediary communication device and the access point in the 802.11 network to transmit communications from the communication device to the access point;
        transmitting a message from the communication device for the access point using the first connection and the second connection;
        tearing down a direct connection in the 802.11 network between the communication device and the access point;
        sharing account parameters of the intermediary communication device with the communication device for communications managed by the 802.11 network; and
        utilizing an agreed addressing procedure in processing communications from either the communication device or the intermediary communication device to the network.

2. The method of identifying for a communication device an intermediary communication device as claimed in claim 1, wherein:
    the intermediary communication device provides a layer 2 bridge for the communication device.

3. The method of identifying for a communication device an intermediary communication device as claimed in claim 1, wherein the first trigger condition is a threshold related to any one or more of a Specific Absorption Rate level of the communication device and a communication bandwidth level between the communication device and the access point.

4. The method of identifying for a communication device an intermediary communication device as claimed in claim 1, further comprising:
    monitoring for a second trigger condition to re-establish a direct connection between the communication device and the access point; and
    upon detection of the second trigger condition
        re-establishing the direct connection between the communication device and the access point; and
        tearing down the first connection and the second connection.

5. The method of identifying for a communication device an intermediary communication device as claimed in claim 1, wherein the first trigger condition is the communication device having of a trusted status with the intermediary communication device.

6. The method of identifying for a communication device an intermediary communication device as claimed in claim 5, further comprising:
    providing a trusted service in the network that the intermediary communication device has been certified to access to the communication device through the first and second connections based on the trusted status.

7. The method of identifying for a communication device an intermediary communication device as claimed in claim 1, wherein:
    the intermediary communication device is identified from a plurality of devices in the 802.11 network based on a quality of a communication link between the communication device and the intermediary communication device.

8. The method of identifying for a communication device an intermediary communication device as claimed in claim 7, wherein:
    a server communicating in the 802.11 network identifies the intermediary communication device from the plurality of devices.

9. The method of identifying for a communication device an intermediary communication device as claimed in claim 8, wherein:
    the quality of the communication link between the communication device and the intermediary communication device relates to a proximity of the communication device to the intermediary communication device.

10. The method of identifying for a communication device an intermediary communication device as claimed in claim 8, wherein:
    the quality of the communication link between the communication device and the intermediary communication device relates to a second communication link in a second network between the communication device and the intermediary communication device.

11. The method of identifying for a communication device an intermediary communication device as claimed in claim 10, wherein:
    the second network is a cellular network.

12. The method of identifying for a communication device an intermediary communication device as claimed in claim 1, wherein the first trigger condition is a threshold related to a battery level of the communication device.

13. A communication device communicating with an access point in a 802.11 network, comprising:
    a communication module to process communications with the 802.11 network;
    a processor;
    a memory device;
    a first module stored on the memory device and providing instructions to the processor to monitor for a first trigger condition to seek an intermediary communication device in the 802.11 network to communicate with the access point, where the trigger condition is related to at least one of the communication device or the 802.11 network;

a second module stored on the memory device that upon detection of the first trigger condition provides instructions to the processor to identify the intermediary communication device in the 802.11 network; and establish a first connection between the communication device and the intermediary communication device in the 802.11 network and a second connection between the intermediary communication device and the access point in the 802.11 network to transmit communications from the communication device to the access point;

tear down a direct connection between the communication device and the access point in the 802.11 network;

share account parameters of the intermediary communication device with the communication device shares for communications managed by the 802.11 network; and utilize an agreed addressing procedure in processing communications from either the communication device or the intermediary communication device to the network; and a third module stored on the memory device that after establishment of the first and second connections provides instructions to the processor to transmit a message from the communication device for the access point using the first connection and the second connection in the 802.11 network.

14. The communication device in a network as claimed in claim 13, wherein:

the intermediary communication device provides a layer 2 bridge for the communication device.

15. The communication device in a network as claimed in claim 13, wherein the first trigger condition is a threshold related to any one or more of a Specific Absorption Rate level of the communication device and a communication bandwidth level between the communication device and the access point.

\* \* \* \* \*